(12) United States Patent
Freischlad

(10) Patent No.: US 8,797,537 B2
(45) Date of Patent: Aug. 5, 2014

(54) INTERFEROMETER WITH A VIRTUAL REFERENCE SURFACE

(75) Inventor: Klaus Freischlad, Tucson, AZ (US)

(73) Assignee: Zygo Corporation, Middlefield, CT (US)

( * ) Notice: Subject to any disclaimer, the term of this patent is extended or adjusted under 35 U.S.C. 154(b) by 394 days.

(21) Appl. No.: 13/293,685

(22) Filed: Nov. 10, 2011

(65) Prior Publication Data

US 2012/0120411 A1    May 17, 2012

Related U.S. Application Data

(60) Provisional application No. 61/414,160, filed on Nov. 16, 2010, provisional application No. 61/413,725, filed on Nov. 15, 2010.

(51) Int. Cl.
*G01B 9/02* (2006.01)

(52) U.S. Cl.
USPC ........................................... 356/450

(58) Field of Classification Search
CPC .......... G01B 9/02015; G01B 9/02097; G01B 9/02098; G01B 9/02047
USPC ................................. 356/450, 521
See application file for complete search history.

(56) References Cited

U.S. PATENT DOCUMENTS

| | | | |
|---|---|---|---|
| 4,983,042 A | 1/1991 | Korner et al. | |
| 6,934,027 B2 | 8/2005 | Prinzhausen et al. | |
| 6,943,895 B2 | 9/2005 | Prinzhausen et al. | |
| 7,812,963 B2 | 10/2010 | de Groot | |
| 2008/0174784 A1 | 7/2008 | Colonna de Lega et al. | |
| 2012/0013908 A1* | 1/2012 | Galle | 356/450 |

FOREIGN PATENT DOCUMENTS

| | | |
|---|---|---|
| JP | 2004-502953 | 1/2004 |
| WO | WO 2010-096912 | 9/2010 |

OTHER PUBLICATIONS

International Search Report mailed on Jun. 1, 2012 in corresponding international application No. PCT/US2011/060222.
Krug, et al., "Contributions to Interference Microscopy", Hilger & Watts Ltd., London 1964, Section 4.12, pp. 63-69.
Japanese Office Action for Application No. JP 2013-538897 dated Apr. 15, 2014 (5 pages).

* cited by examiner

*Primary Examiner* — Jonathan Hansen
(74) *Attorney, Agent, or Firm* — Fish & Richardson P.C.

(57) ABSTRACT

An imaging interferometer includes optics defining an interferometric cavity, in which the optics include a first beam-splitting optic positioned to separate an input beam into a test beam and a reference beam, a second beam-splitting optic positioned to transmit the test beam to the test surface, receive the test beam back from the test surface, and thereafter recombine the test beam with the reference beam, and a third optic positioned to direct the reference beam from the first optic to the second optic. The interferometric cavity defines a virtual reference surface positioned along a path for the reference beam between the second and third optics. The interferometer also includes an imaging channel positioned to receive the recombined test and reference beams, where the imaging channel includes an imaging detector, and at least one imaging element configured to image the test surface and the virtual reference surface onto the detector.

21 Claims, 3 Drawing Sheets

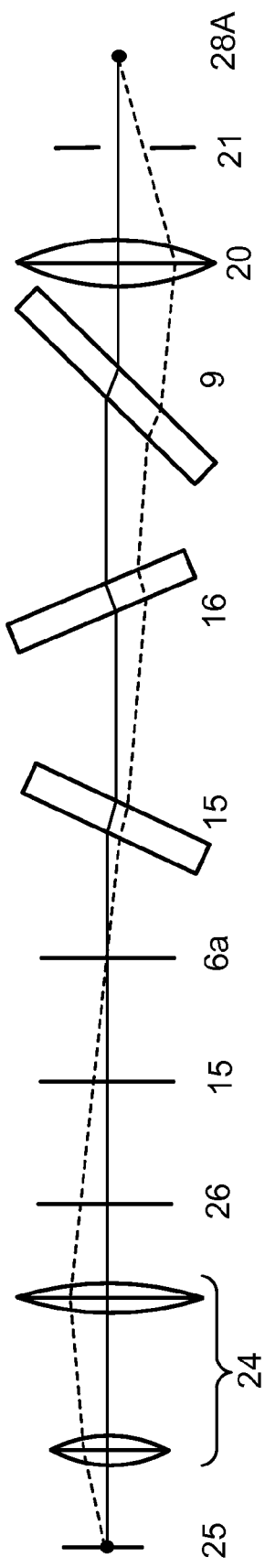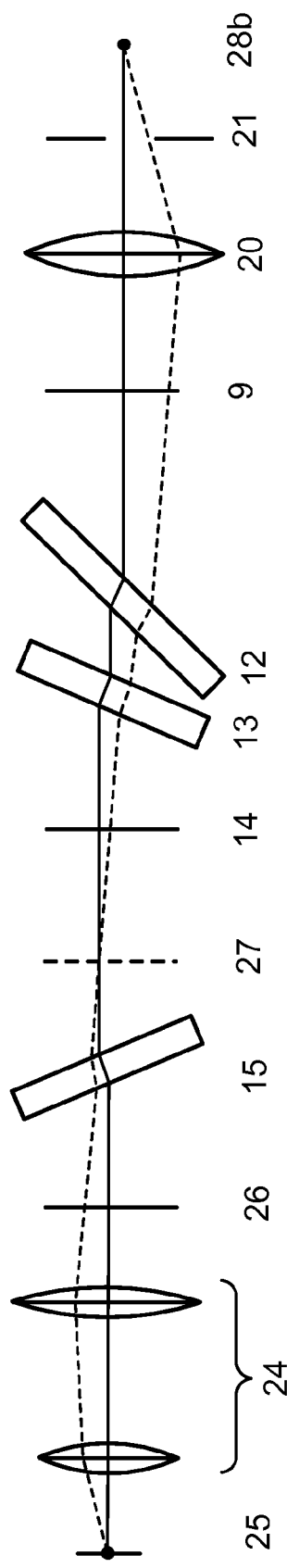

INTERFEROMETER WITH A VIRTUAL REFERENCE SURFACE

CROSS-REFERENCE TO RELATED APPLICATIONS

This application claims benefit to Provisional Patent Application No. 61/413,725, filed on Nov. 15, 2010 and Provisional Patent Application No. 61/414,160 filed on Nov. 16, 2010. The entire contents of both of these provisional applications are incorporated herein by reference.

TECHNICAL FIELD

This disclosure relates to interferometers with a virtual reference surface.

BACKGROUND

Modern polishing technology can provide surfaces with waviness and roughness in the sub-nanometer and Angstrom range. Examples of devices having surface waviness and surface roughness in the foregoing ranges include super-polished optics, magnetic disk substrates, and semiconductor wafers. While the roughness measurements are typically carried out with interference microscopes with high resolution and measurement fields up to a few mm, the waviness measurements tend to require larger measurement fields, e.g., in the tens of mm.

In some cases, the topography measurement of these super-smooth surfaces presents a challenge for the commonly-used interferometers, where the test surface is generally compared to a reference surface inside the interferometer. For the contribution of the interferometric reference surface to be insignificant in the measurement, the roughness and/or waviness of the reference surface topography should be well below that of the test surface, which is difficult to achieve in the example devices mentioned above. Presently, the reference surface topography is determined in a sequence of calibration measurements, and then subtracted from the test surface measurement. However, this procedure may require significant calibration effort. Furthermore, a slight instability in the interferometer can create a shift between the calibration map and the actual measurement error, such that the reference subtraction from the measurement is no longer complete. Frequent recalibrations may be required, especially in the presence of small localized defects and features with significant high-spatial frequency content on the reference surface.

To address one or more of the foregoing problems, interferometric configurations have been described that employ a reference beam where no physical surface is in sharp focus on an interferogram detector of the interferometer (see J. Krug, J. Rienitz, G. Schulz, "*Contributions to Interference Microscopy*", Hilger & Watts, London 1964; U. Gerhard, "*Erfahrungen mit dem Tripelspiegel-Auflichtinterferenzmikroskop*", Feingeraetetechnik 16, 505 (1967); and U.S. Pat. No. 4,983,042, each of which is incorporated herein by reference in their entirety). In such a configuration, the plane in the reference beam optically conjugate to the interferogram detector is called a virtual reference surface. As opposed to other interferometer configurations (e.g., Michelson, Linnik, or Fizeau), there is no real, physical surface in the conjugate plane. Hence if an extended, spatially incoherent light source is used in this type of interferometer, small defects and roughness on all real surfaces in the reference beam appear blurred on the interferogram detector, and their effects on the interferometric measurement are much reduced or eliminated. Conjugate points and planes are discussed, for example, in *Optics, $2^{nd}$ Edition*, by Eugene Hecht, Addison Wesley Publishing Co. (1987), pp. 128-130 and *Fundamentals of Optics, $4^{th}$ edition*, by F. Jenkins, H. White, McGraw Hill Book Company, New York 1976, pp. 47, 48, 62.

SUMMARY

For a robust, production-worthy metrology tool for the topography testing of a smooth sample, it is desirable to have an interferometric configuration with a virtual reference surface that, among other things: (1) exhibits normal incidence of a test beam onto the sample; (2) provides maximum contrast for broadband white-light from an extended, spatially incoherent source; and (3) employs simple plane-parallel plates in a compact, stable geometry, for large measurement fields in the range of tens of mm.

This disclosure presents an interferometer with a virtual reference surface for the topography testing of samples, in which no physical optical surface in the interferometer is conjugate to the interferogram detector. This greatly reduces the calibration requirements of the interferometer system and allows for topography measurements of super-smooth surfaces having roughness and waviness in the sub-Angstrom range. The interferometer cavity has a compact and stable triangular configuration where the triangle is essentially an isosceles triangle. The interferometer is fully compensated for extended, spatially incoherent sources, and is also compensated for broad-band, white light operation by using two additional windows in the cavity. The usage of two additional windows in the triangular configuration of plane-parallel plates compensates for broad-band white light operation.

The integrated alignment-channel of the interferometer enables the cavity, as well as the test surface position, to be adjusted for good fringe contrast in the measurements, which could otherwise be very difficult and cumbersome in an interferometer with a spatially and temporally incoherent source that produces highly localized fringes. In addition, in some aspects, aligning the interferometer cavity can be simplified using the alignment channel having two counter-propagating beams in the triangular cavity without other auxiliary means. The cavity uses plane-parallel optical components, which can be manufactured economically with very high surface accuracy and parallelism. The imaging path from the test source to the interferogram detector does not traverse any of the cavity optics, which could otherwise introduce aberrations in the image and reduce spatial resolution of the topography maps.

This disclosure covers an imaging interferometer for measuring a characteristic of a test surface in which none of the optical components are in focus except for the test surface, and the optical configuration of the interferometer cavity is essentially an isosceles triangle. This disclosure also covers an imaging interferometer for measuring a characteristic of a test surface in which none of the optical components are in focus except for the test surface, and an integral alignment system independent of the imaging system allows for adjusting the position of the optical components for improved measurement performance. This disclosure also covers an imaging interferometer for measuring a characteristic of a test surface in which none of the optical components are in focus except for the test surface, and the optical configuration of the interferometer cavity is essentially an isosceles triangle, and the optical system is compatible with extended (spatially incoherent), spectrally broad band (greater than about 10 nm bandwidth) illumination.

Various aspects of the invention are summarized as follows.

In general, in one aspect, the disclosure features an imaging interferometer for measuring a characteristic of a test surface, the interferometer including optics defining an interferometric cavity, the optics having: a first beam-splitting optic positioned to separate an input beam into a test beam and a reference beam; a second beam-splitting optic positioned to transmit the test beam to the test surface, receive the test beam back from the test surface, and thereafter recombine the test beam with the reference beam; and a third optic positioned to direct the reference beam from the first optic to the second optic. The interferometric cavity defines a virtual reference surface positioned along a path for the reference beam between the second and third optics. The interferometer also includes an imaging channel positioned to receive the recombined test and reference beams, where the imaging channel includes an imaging detector, and at least one imaging element configured to image the test surface and the virtual reference surface onto the detector.

Embodiments can include one or more of the following features. For example, an optical distance for the test beam between the first and second optics is substantially equal to an optical distance for the reference beam between the first and third optics.

In some embodiments, the interferometric cavity defined by the first, second, and third optics has a geometry corresponding substantially to an isosceles triangle.

In some embodiments, the first optic further separates the input beam into first and second alignment beams, the optics defining the interferometric cavity direct the alignment beams to counter-propagate around the interferometric cavity, after which the first optic recombines the alignment beams. The first alignment beam can travel initially along the test beam path before being reflected by the second optic and third optic back to the first optic, and the second alignment beam can travel initially along the reference beam path before being reflected by the second optic back to the first optic. In some implementations, the interferometer further includes an alignment channel including an alignment detector and at least one imaging element configured to receive the recombined alignment beams from the first optic and direct them to the alignment detector.

In some embodiments, the interferometer further includes a first compensating plate positioned in the interferometric cavity along the reference beam path. The first compensating plate can be configured to substantially equalize optical path lengths in glass for the test and reference beams. In some implementations, the interferometer further includes second and third compensating plates positioned, the second compensating plate positioned along the reference beam path and the third compensating plate positioned along the measurement beam path. The second and third compensating plates can be configured to substantially minimize lateral displacement between the measurement and reference beams when the measurement and reference beams are recombined by the second optic.

In some embodiments, the interferometer further includes an illuminator to provide the input beam. In some implementations, the illuminator includes a light source to provide the light for the input beam and one or more imaging optics to receive the light from the light source and direct the input beam toward the interferometric cavity. In some implementations, the illuminator further includes an aperture stop for the light source, and at least one of the imaging optics images the light from the light source to fill the aperture stop and at least another one of the imaging optics directs light from the aperture stop into the interferometric cavity so that the aperture stop defines a telecentric illumination source for the test surface. The input beam can have a spectral bandwidth greater than 10 nm. In some implementations, the interferometer further includes at least one compensating plate in each the test and reference beam paths of the interferometric cavity. The compensating plates can be configured to substantially minimize lateral displacement between the measurement and reference beams over the spectral bandwidth of the input beam when the measurement and reference beams are recombined by the second optic. In some implementations, the illuminator is configured to provide the input beam with an adjustable bandwidth. The light source can be a light-emitting diode (LED).

In some embodiments, the first and second optics are plane-parallel beam-splitters. The third optic can be a mirror.

In general, in a further aspect, the invention features an interferometer, including a first beam splitter positioned to derive test light and reference light from input light and to direct the test light along a first path to contact a test object and direct the reference light along a second path different from the first path; a second beam splitter positioned in the first and second paths and arranged to combine the reference light with test light after the test light contacts the test object; a detector positioned to receive the combined test and reference light; and an objective arranged to image the test object and a virtual reference surface onto the detector, wherein the virtual reference surface corresponds to virtual surface optically conjugate to the detector between the first and second beam splitters.

Embodiments of the interferometer can include one or more of the following features and/or features of other aspects. For example, an optical path length of the first path from the first beam splitter to the second beam splitter via the test object can be substantially equal to an optical path length of the second path from the first beam splitter to the second beam splitter.

The interferometer can include an optical element positioned in the second path and arranged to direct reference light from the first beam splitter toward the second beam splitter. An optical path length for the test light between the first and second beam splitters is substantially equal to an optical path length for the reference light between the first beam splitter and the optical element positioned in the second path. The first and second paths between the first and second beam splitters, in combination with the optical element positioned in the second path, can define a geometry corresponding substantially to an isosceles triangle.

The test light can correspond to input light transmitted by the first beam splitter and the reference light corresponds to input light reflected by the first beam splitter.

The interferometer can include an alignment channel corresponding to a path of light combined at the first beam splitter, where the combined light propagates from the second beam splitter to the first beam splitter along the first or second paths. The interferometer can include a second detector positioned at the alignment channel to detect the combined light.

The interferometer can include a first compensating optical element positioned in the second path between the first and second beam splitters, wherein the first compensating optical element reduces an optical path length difference within an optical material between the test and reference light. The first compensating optical element can be arranged to reduce a lateral displacement between the test and measurement light at the detector. The first compensating optical element can be a plane parallel plate tilted with respect to the second path. The interferometer can include one or more additional compensating optical elements positioned in the first and/or second paths, wherein the one or more additional compensating optical elements reduce the optical path length difference within optical material between the test and reference light and/or to reduce a lateral displacement between the test and measurement light at the detector.

The interferometer can include an illuminator configured to provide the input light during operation of the interferometer. The illuminator can include a light source and one or more optical elements arranged to receive light from the light source and direct the light toward the first beam splitter. The one or more optical elements can be arranged so that the test light is telecentric at the test object. The light source can be configured to provide light having a spectral bandwidth greater than 10 nm. The light source can include a light emitting diode (LED).

The first and second beam splitters can include plane parallel optical elements.

The interferometer can be arranged to image a surface of the test object within a field onto the detector, the field having a dimension of 10 mm or more.

The interferometer can include an electronic processor in communication with the detector, wherein during operation the electronic processor receives signals comprising interferometric information about an optical path length difference between the test and reference light at the detector and determines information about the test object based on the signals.

In general, in another aspect, the invention features an interferometry method for determining information about a test object, the method including: deriving test light and reference light from input light at a first optical element; directing the test light along a first path to contact a test object and directing the reference beam along a second path different from the first path; combining, at a second optical element different from first optical element, the reference light with test light after the test light contacts the test object; and imaging the test object and a virtual reference surface onto a detector, wherein the virtual reference surface corresponds to a virtual surface in the second path optically conjugate to the image at the detector in the second path.

Implementations of the method can include any of the features discussed above with respect to the other aspects.

The details of one or more embodiments are set forth in the accompanying drawings and the description below.

BRIEF DESCRIPTION OF DRAWINGS

FIG. 2A is a schematic diagram of a test beam path through the interferometer of FIG. 1.

FIG. 2B is a schematic diagram of a reference beam path through the interferometer of FIG. 1.

DETAILED DESCRIPTION

Figure 1:
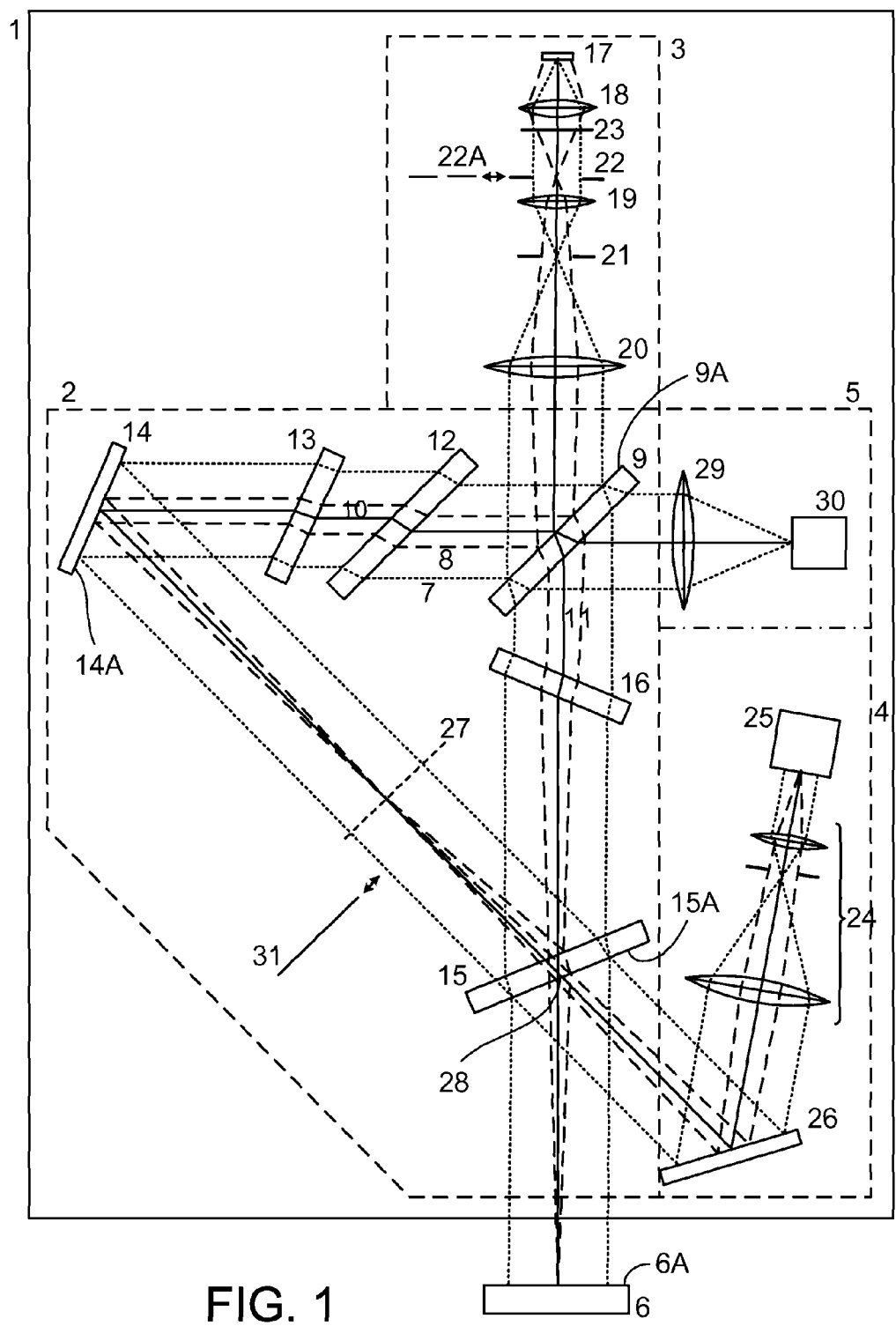
FIG. 1 is a schematic diagram of an exemplary interferometer.

Referring to FIG. 1, an exemplary interferometer system 1 is shown, in which the interferometer system 1 includes 4 major assemblies: an interferometric cavity 2; an illuminator 3; an imaging arm 4; and and an alignment channel 5. In addition, a test piece 6 with a surface under test 6A is shown completing the interferometric test setup. A central imaging bundle includes source imaging 7 shown in dotted lines, and test object imaging 8 shown in dashed lines.

In the interferometric cavity 2, the beam splitter 9 receives light from the illuminator 3, and reflects a part of the incoming light as a reference beam 10, and transmits another part of the incoming light as a test beam 11. After reflection at a first surface 9A of the plane-parallel beam splitter 9, the reference beam 10 passes through plane-parallel compensators 12 and 13, and is reflected at surface 14A of turn mirror 14 towards plane-parallel beam splitter 15, through which the reference beam 10 passes. After transmission through beam splitter 9, the test beam 11 passes through plane-parallel compensator 16 and beam splitter 15, is reflected at the test surface 6a and directed back to beam splitter 15, where the test beam 11 is reflected at the surface 15A facing the test piece. Thus, the reference beam 10 and the test beam 11 are recombined at beam splitter 15, and both beams are directed to the imaging arm 4.

The interferometric cavity 2 includes plane-parallel plates 9, 12, 13, 15, and 16, which are used in transmission or reflection, and a plane turn mirror 14, which is used in reflection. Typically, plane-parallel optical components can be manufactured to very high surface accuracy and parallelism using fast and cost-effective manufacturing techniques.

The illuminator 3 contains a light source 17 and lenses 18, 19, and 20 to convey the beam from the source to the interferometer cavity 2, such that the light source 17 is imaged onto the aperture stop 21, and such that the image of the light source fills the aperture stop. In some implementations, the aperture stop 21 can be considered the effective source for the interferometer illumination. The aperture stop 21 in turn is imaged to infinity by lens 20, making the illumination of the test surface 6a telecentric. The field stop 22 is imaged onto the surface under test 6a along the test beam 11, as well as onto plane 27 along the reference beam.

The light source 17 is an extended incoherent source, such as, for example, a light-emitting diode (LED) or a halogen lamp. Optionally, a spectral filter 23 can be placed in the beam to shape the output spectrum of the source. Depending on the light source and the filtering, the wavelength spectrum of the beam illuminating the interferometer cavity 2 can range from narrow-band with about 1 nm bandwidth or less, to very broad-band with hundreds of nanometer bandwidth. Other light sources can also be used, such as, for example, arc lamps and lasers. In some cases, the light sources can be used with an intermediate diffuser. Alternatively, or in addition, light from the source also can be fiber-coupled to the interferometer. In some implementations, an illuminator with selectable light properties can be implemented by providing more than one spectral filter 23 and an actuator/positioner to move the chosen filter into the beam. Alternatively or in addition, a beam splitter can be used before the field stop 22 to combine beams from two light sources, where the two light sources are alternately switched on and off for selecting one or the other source. For example, in some implementations, a first light source includes a broad-band white light LED with a long-pass spectral filter, whereas a second light source includes a blue LED with an additional interference filter for narrow band light. Thus, the center wavelength and bandwidth of the light can be switched according to the requirements of the measurement to be made on the test piece 6.

In the imaging arm 4, the reference beam 10 and test beam 11 are relayed by imaging objective 24 to an interferogram detector 25, where the reference beam 10 and test beam 11 interfere and create a fringe pattern. The interferogram detector 25 can include an electronic camera such as, for example, a CCD-camera to sense the interferograms and transmit them in digital form to a computer for processing as described in more detail further below. Depending on space requirements, a fold mirror 26 may be used to redirect the beams away from the test piece space.

In order to resolve fine detail on the surface under test 6A, the surface is imaged in the test beam by the imaging objective 24 on to the interferogram detector 25. The imaging path from the test surface 6A to the imaging objective 24 does not traverse any of the cavity components. Passing through plane plates at non-normal incidence could otherwise introduce imaging aberrations, resulting in decreased imaging resolution.

The plane 27 in the reference beam, which is also imaged by objective 24 onto the interferogram detector 25, is located between turn mirror 14 and beam splitter 15. The plane 27 is called a virtual reference surface, since there is no real physical surface at this location. While the test surface and virtual reference surface are in sharp focus on the camera, all real optical surfaces of the interferometer system 1 are out of focus and blurred. This blurring causes high-spatial frequency errors of the interferometer optics to be attenuated or suppressed in the topography measurement of the surface under test. This blurring can also be interpreted as an averaging of the surface errors over the footprint of the source imaging bundle 8 on the optics surfaces, for example area 28 on surface 15A of beam splitter 15.

The spatial extent of the incoherent light source, as well as the spectral width of the light detected by the interferogram detector 25, lead to special guidelines for obtaining best fringe contrast at the interferogram detector 25 (see W. H. Steel, *"Interferometry"*, Cambridge University Press, Cambridge 1967, incorporated by reference herein in its entirety). The guidelines can be set forth as follows:

a) For broad band light, the group optical path length for the reference beam and the test beam should be the same. For narrow band light, the optical path length of both beams, at a minimum, should be the same.

b) When imaging a point on the interferogram detector into source space along the test beam and reference beam of the interferometer, the locations of the two image points in source space should be identical and the number of reflections along the test beam and reference beam should be the same.

c) Imaging aberrations for the imaging of section b) should be the same for test arm and reference arm.

With a rate depending on the source extent and spectral width, the fringe contrast will deteriorate as these guidelines are not met. In addition to these guidelines, the virtual reference surface 27 should be as far away as possible from the nearest real optical surfaces for advantageous blurring of these surfaces. The simplest configuration satisfying all these guidelines corresponds to the exemplary cavity configuration as shown in FIG. 1, where the cavity triangle is approximately an isosceles triangle. Having an isosceles triangle with equal legs means that the geometric distance along the axial ray between surface 9A of beam splitter 9 and surface 14A of turn mirror 14 is equal to the geometric distance along the axial ray between the surface 9A of beam splitter 9 and surface 15A of beam splitter 15. The third side of the triangle between turn mirror 14 and beam splitter 15 is given by the proper angle adjustment of these components such that the test beam 10 and the reference beam 11 intersect at surface 15A of beam splitter 15, as well as don't exhibit a beam shear as explained further below in the discussion of the alignment channel 5.

As long as the glass thicknesses of beam splitter 9 and compensator 12 are the same, and the glass thicknesses of compensators 13 and 16 are the same, the air path as well as the glass path of reference beam and test beam can be made the same with proper alignment of the cavity components. Proper alignment entails matching the angles of incidence on the beam splitter 9 to the angles of incidence on compensator 12, and matching the angles of incidence on compensators 13 and 16 to the angles of incidence on the beam splitter 15. This can be better seen in FIGS. 2A and 2B, where the test beam and reference beam are shown separately and all mirror reflections are unfolded.

The element numbering in FIGS. 2A and 2B matches the numbering in FIG. 1. FIG. 2A shows the imaging of a point on the interferogram detector 25 back to point 28A in source space along the test beam, where the mirror reflections are indicated by vertical lines. FIG. 2B shows the image location 28B for the reference beam to be in the same locations as point 28A with respect to aperture stop 21. It is also seen that the number of reflections in both beams are the same. Furthermore, the number of plane-parallel plates and their angles are identical for test and reference beam, but their sequence is different. Since the axial location of plane parallel plates does not affect the amount of aberrations introduced, the imaging aberrations are also the same for both beams.

As can also be seen in FIG. 2, due to the non-normal incidence on the plane-parallel plates there is a lateral beam displacement in each plate. One overall displacement can be compensated for by the alignment of the cavity to achieve coincidence of points 28A and 28B in source space. However, for broad band light the dispersion of the glass leads to a lateral beam displacement dependent on the wavelength of the light. This in turn leads to a lateral spread between points 28A and 28B in source space, and the contrast of the interference fringes at the interferogram detector 25 is reduced. The spectral spread of beam displacements in beam splitter 15 occurs in opposite directions, and is eliminated by compensators 13 and 16 in the way shown. Hence, with compensators 13 and 16, the location of points 28A and 28B are made to coincide for all wavelengths. If the spectral spread is small enough for good fringe contrast, the compensators 13 and 16 may be left out.

With effectively the same number of plane-parallel plates in the test beam and reference beam, and the two legs of the isosceles triangle being equal, matching the optical path of test and reference beam requires that the geometric distance along the axial ray between surface 14A of turn mirror 14 and surface 15A of beam splitter 15 is twice the distance between surface 15A of beam splitter 15 and test surface 6A. This places the virtual reference surface 27 close to the center between surface 14A of turn mirror 14 and the back surface of beam splitter 15. The virtual reference surface is not perfectly centered, but closer to beam splitter 15 by typically ⅙ th of the geometric length of the axial ray in beam splitter 15.

The cavity configuration and component arrangement as described above provides good fringe contrast with the proper positioning and alignment of all components. In interferometers with extended broad band sources, the initial alignment is difficult if fringes are not yet visible and there is no indication of the kind and direction of the required adjustments. Alignment channel 5 in FIG. 1 is provided as an advantageous aid for the setup and operation of this kind of interferometer. The alignment channel 5 includes lens 29 and align detector 30. The align detector 30 could include, for example, a screen for visual observation, or an electronic camera that acquires alignment images, which can be displayed on a monitor or processed in a computer.

The alignment of the interferometric test setup is carried out in two steps. First, the interferometer cavity 2 is aligned without a test piece present, typically at time of manufacturing or installation of the instrument. Second, the test piece 6 is aligned to the interferometer as part of the regular measurement process.

For the first step, the two beams counter-propagating through the triangular cavity are directed to the alignment detector 30. Coming from the illuminator, the clockwise (CW) beam is transmitted by beam splitter 9 and compensator 16, reflected at surface 15A of beam splitter 15 and at surface 14A of turn mirror 14, transmitted by compensators 13 and 12, and finally transmitted again by beam splitter 9 to lens 29. The counterclockwise (CCW) beam is reflected at surface 9A of beam splitter 9, transmitted by compensators 12 and 13, reflected at surface 14A of turn mirror 14 and at surface 15A of beam splitter 15, transmitted by compensator 16, and finally reflected again at surface 9A of beam splitter 9 to the align lens 29. Since both beams propagate the same optical path in opposite directions, the CW and CCW beam are parallel at lens 29 but may exhibit a lateral displacement. If at first the components are coarsely out of alignment, the align detector 30 can be moved back from the rear focal plane of lens 29, such that the virtual reference surface 27, and hence also the field stop 22 of illuminator 3, are imaged onto the align detector 30. Then one component of the cavity, e.g., the turn mirror 14 or beam splitter 15, is adjusted in tip/tilt or position until both images of the field stop coincide on the align detector, and the shear between the CW and CCW beam is much reduced. The align detector 30 is then moved to the rear focal plane of lens 29.

A moderate beam shear is visible in the foregoing configuration as fringes across the image of the aperture stop 21 on the align detector 30. The fringes are a very sensitive indication of beam shear. The adjustable cavity component is finely adjusted until the fringes on the aperture stop image are broadened out and uniform light level is obtained across the aperture stop image. With this adjustment the first alignment step is complete. The alignment step ensures that fringes can be achieved by properly aligning the test piece. If the instrument is sufficiently stable, the alignment step does not need to be repeated.

For the alignment of the test surface 6A to the interferometer, first the tip and tilt of the test piece 6 need to be adjusted. For this adjustment, the beam reflected by the test surface back to the alignment channel 5 is used, i.e., the test beam transmitted by beam splitter 9, compensator 16, and beam splitter 15, reflected by the test surface 6A, transmitted again by beam splitter 15 and compensator 16, and finally reflected by surface 9A of beam splitter 9 to the align lens 29. The test beam also leads to an image of the aperture stop 21 on the align detector. For aligning tip and tilt of test surface 6A, this aperture stop image is brought to coincidence with that of any of the CW or CCW beams, which are also present on the align detector. This alignment ensures that the test beam is sufficiently parallel to the reference beam at the interferogram detector 25, and fringes can be observed after the next, final alignment step.

Next, the axial position of the test piece along the test beam is adjusted, such that the optical path length of the test beam 11 matches the optical path length of reference beam 7. Since test surface 6A is sharply imaged onto interferogram detector 25 when the surface 6A is at the position of best or near best fringe contrast, a coarse alignment can be carried out by optimizing the image sharpness of the test piece on the interferogram detector 25, if the test piece has sufficient structure to focus on. If the test piece is very smooth and does not show any discernible structure, then field stop 22 is replaced by alignment field stop 22A which contains some visible features, e.g., a small aperture. Since the field stop is also imaged onto the proper test surface location, the image sharpness of the field stop image is optimized as part of the coarse axial focus on smooth parts. For the subsequent fine adjustment of axial position, the align field stop 22A is replaced again by standard field stop 22, and test piece 6 is moved axially until the contrast of the interference fringes on the interferogram detector 25 is optimized. Now the whole interferometric test setup including interferometer 1 and test piece 6 is ready for measurement.

An additional aid for aligning the system is the beam block 31 which can be placed in the reference beam 10 such that light other than test beam 11 light is blocked from reaching the align detector 30 and interferogram detector 25. Blocking the light from the reference beam during tip/tilt alignment and coarse axial alignment of the test piece 6 can provide a better alignment signal if the return from the test surface is weak or scattered. Furthermore, with the reference beam blocked, the interferometer can also be used for standard imaging of the test surface without fringes present.

The configuration for the interferometer as described above is well suited for measurement fields larger than in typical microscopes. In an example implementation, the interferometer can include a measurement field of 20 mm×20 mm on the test surface, an imaging numerical aperture (NA) of 0.025, and a distance between the test surface 6A and the surface 15A of beam splitter 15 of about 76.2 mm. The spacing between surface 14A of turn mirror 14 and the back surface of beam splitter 15 is about 146.6 mm. The offset of the virtual reference surface 27 from the center between surface 14A and the back surface of beam splitter 15 is about 1.3 mm. The closest optical surface in the cavity to the test surface 6A or the virtual reference surface 27 is the back surface of beam splitter 15. The slightly elliptical imaging bundle footprint on the back surface has an extent of about 3.6 mm×3.9 mm.

Other implementations also are possible. For example, in some implementations, the imaging NA and/or the measurement field are adapted to higher or lower values. Although the deflection angle of the reference beam is shown as 90 degrees, the deflection angle can be changed while maintaining an approximately isosceles triangle for the cavity. In certain implementations, the align channel 5 is moved between the illuminator 3 and cavity 2 with the usage of an additional beam splitter. If imaging aberrations through the tilted plates can be neglected or compensated, the imaging arm 4 can be placed at the location of the align channel 5. The optical configuration can also be rearranged to reduce the number of parts or simplify manufacturing. For example, in some implementations, the beam splitter 9 and the compensator 12 can be combined into a single element.

Figure 3:
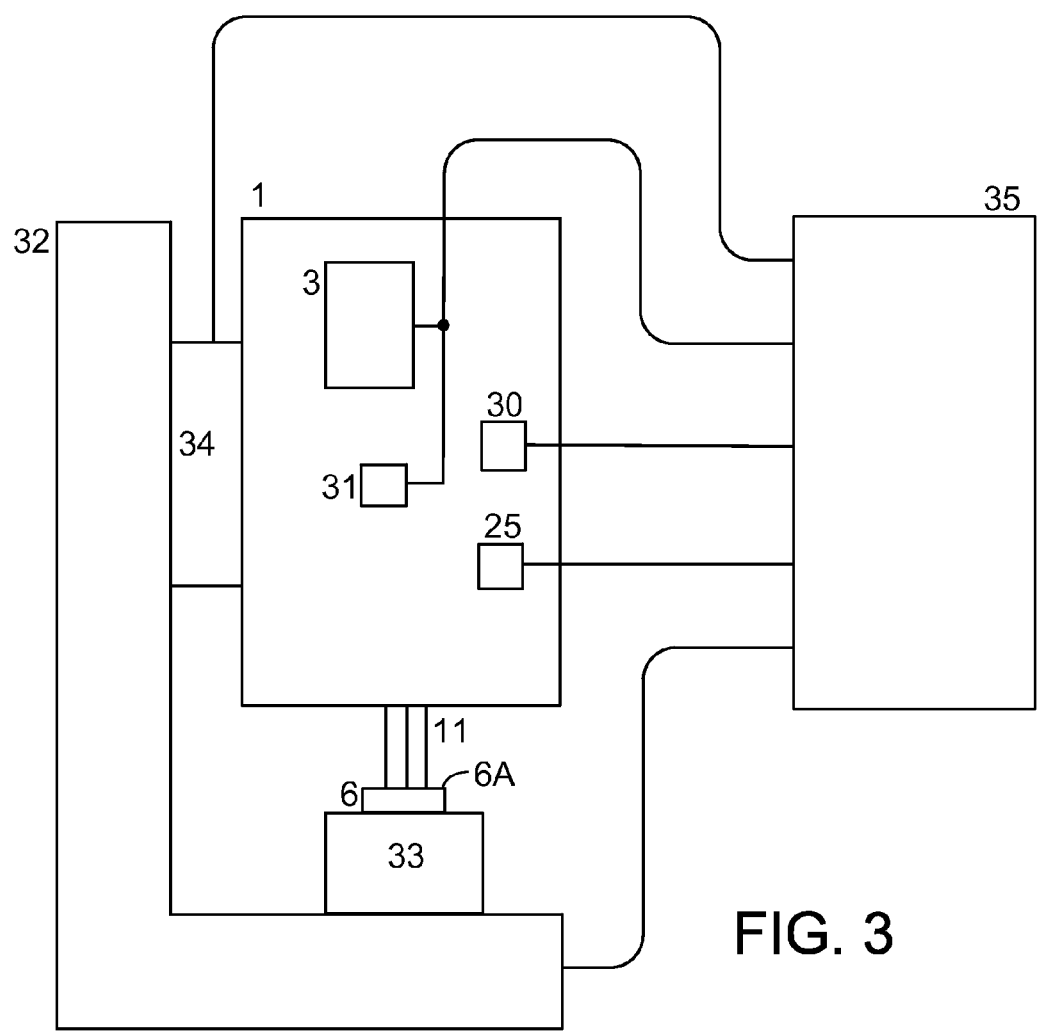
FIG. 3 is a schematic diagram of an exemplary measurement system that includes the interferometer of FIG. 1.

An exemplary measurement system incorporating interferometer system 1 is shown in FIG. 3, where the element numbering matches the element numbering in FIG. 1. The interferometer system 1 is attached to an instrument frame 32 by a scanning mechanism 34. The scanning mechanism 34 provides controlled motion in the z-direction, which is the vertical direction in the drawing plane. The scanning mechanism 34 is connected to the control computer 35 and can include, but is not limited to, a piezo-electric transducer. The test piece 6 is placed in the test beam 11 on an adjustable test piece holder 33. This test piece holder 33 enables adjusting the x, y, and z-position, as well as tip and tilt, of the test piece, where the x and y directions are in the plane normal to the drawing plane. The adjustment of the test piece can be carried out either manually or under control of computer 35. If the adjustment is carried out under the control of the computer 35, the motion axes can be motorized, where the test piece holder 33 receives control signals from computer 35. The output signals from the two cameras in the interferometer system, i.e., from the interferogram detector 25 and the align detector 30, are transmitted to the control computer for analysis and display to the user.

An additional control line connects the computer 35 to the interferometer system for the control of auxiliary functions, such as the control of the light level and spectral selection in illuminator 3, the selection of the field stop 22 or alignment field stop 22A in illuminator 3, and the control of the reference beam block 31.

For a surface topography measurement, the distance between the test surface 6A and the interferometer system 1 can be varied in a linear fashion by scan mechanism 34. During this motion, the image data from the interferogram detector 25 are acquired into computer 35 for the data processing to obtain the surface map. The fully compensated interferometer system 1 with illuminator 3 with selectable light bandwidth is capable of acquiring data in phase shift mode with narrow band light (see, for example, K. Freischlad, C. L. Koliopoulos, "*Fourier description of digital phase-measuring interferometry*", J. Optical Society of America A 7, 542 (1990), incorporated by reference herein in its entirety), as well as in white-light scan mode with broad band light (see, for example, L. Deck, P. de Groot, "*High-speed noncontact profiler based on scanning white-light interferometry*", Applied Optics 33, 7334 (1994), incorporated by reference herein in its entirety). The data acquired in white-light scan mode can also be used not only to determine the surface topography, but also the film properties of test surfaces with thin film coatings (see, for example, U.S. Pat. No. 7,321,431, incorporated by reference, herein in its entirety).

Different configurations of the measurement system can be implemented. The z-adjustment actuation may be placed where the interferometer system 1 is mounted to the instrument frame 32 instead of in the test piece holder 33. Alternatively, or in addition, the scan mechanism 34 can be placed at the test piece holder 33 instead of at the mount of the interferometer system 1 to the instrument frame. For short scans, the turn mirror 14 can be mounted on a scan actuator. In this case the path difference between the test beam and reference beam is varied without moving the whole interferometer system 1 or test piece 6.

In general, information about the test object can be determined from interferometry data using a computer or other hardware containing an electronic processor. Generally, analysis of the interferometry data can be implemented in software, hardware or a combination of both. The methods can be implemented in computer programs using standard programming techniques following the method and figures described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic disk) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

Embodiments relate to interferometry systems and methods for determining information about a test object. Additional information about suitable interferometry systems, electronic processing systems, software, and related processing algorithms is disclosed in commonly owed U.S. patent applications published as U.S.-2005-0078318-A1 entitled "METHODS AND SYSTEMS FOR INTERFEROMETRIC ANALYSIS OF SURFACES AND RELATED APPLICATIONS," U.S.-2004-0189999-A1 entitled "PROFILING COMPLEX SURFACE STRUCTURES USING SCANNING INTERFEROMETRY," and U.S.-2004-0085544-A1 entitled "INTERFEROMETRY METHOD FOR ELLIPSOMETRY, REFLECTOMETRY, AND SCATTEROMETRY MEASUREMENTS, INCLUDING CHARACTERIZATION OF THIN FILM STRUCTURES," the contents of which are incorporated herein by reference.

Other embodiments are within the scope of the following claims.

What is claimed is:

1. An interferometer, comprising:
a first beam splitter positioned to derive test light and reference light from input light and to direct the test light along a first path to contact a test object and direct the reference light along a second path different from the first path;
a second beam splitter positioned in the first and second paths and arranged to combine the reference light with test light after the test light contacts the test object;
an optical element positioned in the second path and arranged to direct reference light from the first beam splitter toward the second beam splitter;
a detector positioned to receive the combined test and reference light; and
an objective arranged to image the test object and a virtual reference surface onto the detector,
wherein the virtual reference surface corresponds to a virtual surface optically conjugate to the detector between the first and second beam splitters;
wherein the first and second paths between the first and second beam splitters, in combination with the optical element positioned in the second path, define a geometry corresponding substantially to a triangle.

2. The interferometer of claim 1, wherein an optical path length of the first path from the first beam splitter to the second beam splitter via the test object is substantially equal to an optical path length of the second path from the first beam splitter to the second beam splitter.

3. The interferometer of claim 1, wherein an optical path length for the test light between the first and second beam splitters is substantially equal to an optical path length for the reference light between the first beam splitter and the optical element positioned in the second path.

4. The interferometer of claim 1, wherein the first and second paths between the first and second beam splitters, in combination with the optical element positioned in the second path, define a geometry corresponding substantially to an isosceles triangle.

5. The interferometer of claim 1, wherein the test light corresponds to input light transmitted by the first beam splitter and the reference light corresponds to input light reflected by the first beam splitter.

6. The interferometer of claim 1, further comprising an alignment channel corresponding to a path of light combined at the first beam splitter, where the combined light propagates from the second beam splitter to the first beam splitter along the first or second paths.

7. The interferometer of claim 6, further comprising a second detector positioned at the alignment channel to detect the combined light.

8. The interferometer of claim 1, further comprising a first compensating optical element positioned in the second path between the first and second beam splitters, wherein the first compensating optical element reduces an optical path length difference within an optical material between the test and reference light.

9. The interferometer of claim 8, wherein the first compensating optical element is arranged to reduce a lateral displacement between the test and measurement light at the detector.

10. The interferometer of claim 8, wherein the first compensating optical element is a plane parallel plate tilted with respect to the second path.

11. The interferometer of claim 8, further comprising one or more additional compensating optical elements positioned in the first and/or second paths, wherein the one or more additional compensating optical elements reduce the optical path length difference within optical material between the test and reference light and/or to reduce a lateral displacement between the test and measurement light at the detector.

12. The interferometer of claim 1, further comprising an illuminator configured to provide the input light during operation of the interferometer.

13. The interferometer of claim 12, wherein the illuminator comprises a light source and one or more optical elements arranged to receive light from the light source and direct the light toward the first beam splitter.

14. The interferometer of claim 13, wherein the one or more optical elements are arranged so that the test light is telecentric at the test object.

15. The interferometer of claim 13, wherein the light source is configured to provide light having a spectral bandwidth greater than 10 nm.

16. The interferometer of claim 13, wherein the light source comprises a light emitting diode (LED).

17. The interferometer of claim 1, wherein the first and second beam splitters comprise plane parallel optical elements.

18. The interferometer of claim 1, wherein the interferometer is arranged to image a surface of the test object within a field onto the detector, the field having a dimension of 10 mm or more.

19. The interferometer of claim 1, further comprising an electronic processor in communication with the detector, wherein during operation the electronic processor receives signals comprising interferometric information about an optical path length difference between the test and reference light at the detector and determines information about the test object based on the signals.

20. An interferometry method for determining information about a test object, the method comprising:
  deriving test light and reference light from input light at a first optical element;
  directing the test light along a first path to contact a test object and directing the reference beam along a second path different from the first path;
  combining, at a second optical element different from the first optical element, the reference light with test light after the test light contacts the test object;
  imaging the test object and a virtual reference surface onto a detector,
  wherein the virtual reference surface corresponds to a virtual surface in the second path optically conjugate to the image at the detector in the second path,
  wherein the second path includes a third optical element positioned and arranged to direct reference light from the first optical element toward the second optical element; and
  wherein the first and second paths between the first and second optical elements, in combination with the third optical element positioned in the second path, define a geometry corresponding substantially to a triangle.

21. An interferometer for measuring a characteristic of a test surface, said interferometer comprising:
  (a) optics defining an interferometric cavity, said optics including:
    a first beam-splitting optic positioned to separate an input beam into a test beam and a reference beam,
    a second beam-splitting optic positioned to transmit the test beam to the test surface, receive the test beam back from the test surface, and thereafter recombine the test beam with the reference beam, and
    a third optic positioned to direct the reference beam from the first optic to the second optic, wherein the interferometric cavity defines a virtual reference surface positioned along a path for the reference beam between the second and third optics,
    wherein said first beam-splitting optic, said second beam-splitting optic and said third optic, together define a geometry corresponding substantially to a triangle; and
  (b) an imaging channel positioned to receive the recombined test and reference beams, said imaging channel including an imaging detector, and at least one imaging element configured to image the test surface and the virtual reference surface onto the detector.

* * * * *